United States Patent [19]

Bilsland et al.

[11] Patent Number: 4,724,632

[45] Date of Patent: Feb. 16, 1988

[54] FILAMENT SEED THRESHER

[75] Inventors: Douglas M. Bilsland, Junction City; Arnold G. Berlage, Corvallis, both of Oreg.

[73] Assignees: The United States of America as represented by the Secretary of Agriculture, Washington, D.C.; The State of Oregon acting by and through the Oregon State Board of Higher Education on behalf of Oregon State University, Corvallis, Oreg.

[21] Appl. No.: 779,958

[22] Filed: Sep. 25, 1985

[51] Int. Cl.⁴ .......................... A01C 1/00; A01F 9/00; B02B 3/00

[52] U.S. Cl. ................................. 47/58; 47/DIG. 9; 99/612; 130/28; 130/30 H; 366/279; 366/607

[58] Field of Search ............. 47/DIG. 9, 58; 366/103, 366/163, 191, 244, 245, 254, 279, 285, 292, 326, 607; 99/612-615, 618, 621, 622; 426/484; 56/16.5; 130/28, 30 H

[56] References Cited

U.S. PATENT DOCUMENTS

| | | | |
|---|---|---|---|
| 304,147 | 8/1884 | Taylor | 47/DIG. 9 |
| 340,635 | 4/1886 | Stead | 47/58 |
| 510,769 | 12/1893 | Bodine | 99/615 |
| 2,731,052 | 1/1956 | Grimard | 47/DIG. 9 |
| 3,708,967 | 1/1973 | Geist et al. | 56/12.7 |
| 3,826,068 | 7/1974 | Ballas et al. | 56/12.7 |
| 3,859,776 | 1/1975 | Ballas et al. | 56/12.7 |
| 4,035,912 | 7/1977 | Ballas et al. | 30/276 |
| 4,052,789 | 10/1977 | Ballas | 30/276 |
| 4,054,992 | 10/1977 | Ballas et al. | 30/276 |
| 4,067,108 | 1/1978 | Ballas | 30/276 |
| 4,173,177 | 11/1979 | Davis | 99/618 |
| 4,281,505 | 8/1981 | Fuelling, Jr. et al. | 56/12.7 |
| 4,335,510 | 6/1982 | Close et al. | 30/276 |
| 4,359,831 | 11/1982 | Loiseau | 47/58 |
| 4,411,069 | 10/1983 | Close et al. | 30/276 |
| 4,419,822 | 12/1983 | Harris | 30/276 |

FOREIGN PATENT DOCUMENTS

| | | | |
|---|---|---|---|
| 64375 | 9/1892 | Fed. Rep. of Germany | 99/622 |
| 2248863 | 5/1973 | Fed. Rep. of Germany | 130/28 |
| 1042788 | 9/1983 | U.S.S.R. | 366/279 |

OTHER PUBLICATIONS

*Mechanical Seed Cleaning and Handling*, Agriculture Handbook No. 354, Agricultural Research Service, U.S. Department of Agriculture, p. 37 (1968).
A. G. Berlage, D. M. Bilsland, and P. M. Holman, "Belt Thresher with Adjustable Threshing Action," Paper No. 85-3042 presented at the 1985 Summer Meeting of the American Society of Agricultural Engineers, Jun. 23-26, 1985.
*Principles of Farm Machinery* by R. A. Kepner, R. Bainer, and E. L. Barger, AVI Publishing Company, Inc., Westport, Conn., pp. 376-379 (1972).

Primary Examiner—James R. Feyrer
Attorney, Agent, or Firm—M. Howard Silverstein; David G. McConnell; Margaret A. Connor

[57] ABSTRACT

A method and apparatus for removing appendages from seeds are described. The apparatus includes a chamber to contain the seed to be threshed. Mounted rotatively in the chamber is at least one filament spool means which, upon rotation, causes filament to be paid out and thresh the seed. Means are attached to the chamber to draw a gaseous medium through the chamber to suspend the seed with appendages in the threshing zone. After the appendages are removed, the appendage-free seed is discharged from the cylinder. The invention finds particular use in the threshing of seeds armed with appendages that are difficult or impossible to remove with existing seed threshing equipment.

5 Claims, 3 Drawing Figures

FILAMENT SEED THRESHER

BACKGROUND OF THE INVENTION

1. Field of the Invention

This invention relates to and has among its objects the provision of a novel method and apparatus for threshing seeds to remove appendages attached to the seeds. The invention finds particular use in the threshing of seeds armed with appendages that are difficult or impossible to remove with existing seed threshing equipment.

2. Description of the Art

Seeds of some species of plants produce structures during development that serve various functions including protection from damage or aid in dispersal. These structures include awns, beards, tails, hair, fuzz, pappus, bristles, and a variety of other appendages. Since most do not contribute to normal germination of crop seed, that is, do not carry reproductive or nutritive tissue, it is desirable that these appendages be removed by seed-conditioning procedures. Removal of such appendages enhances the cleaning, conveying, and planting of these seeds. Seeds not conditioned in this manner attach to inert material and weed seed contributing to contamination of planting areas. Additionally, because resources such as water, nutrients, and light are used more advantageously by seed which has been freed of appendages, planting such seed results in a saving of time and money for crop producers.

Attachment of appendages to crop seed can also reduce the ability of precision p anters to convey and singulate seed due to attachment of crop seed to each other. Machine planting techniques are important because they allow seed to be efficienty planted at proper intervals and depths. Where crop seed cannot be conditioned for machine planting, the seed must be planted and thinned by hand resulting in greaty increased production costs and decreased planting effciency.

Several types of machines have been designed to remove appendages from crop seed. Spike tooth threshers are commonly used to debeard seed crops including barley, carrot, and grass seed. Belt threshers, which employ two contacting endless belts moving the same direction at different speeds, are used on flower, vegetable, and legume seeds. A number of other designs employ rollers, concaves, hammers, and belts to remove the hulls and appendages from seeds. Seed threshing machines which use rubbing action have the disadvantages that they are not capable of removing appendages such as fuzz, hair, pappus, and the like, and they tend to damage seed. Seed threshing machines which use compressed air have the disadvantages that they have high energy requirements, they produce a dusty environment, and they can only be used for batch processes.

Some types of seed, notably flower seeds such as marigold, gazania, arctotis, and anemone, which are grown primarily for use in the bedding plant and cut flower industries, produce appendages that resist removal by conventional conditioning equipment. This characteristic makes machine planting ineffective resulting in the need for hand planting and thinning, increasing production costs. For some types of seeds, it is necessary to manually remove appendages, cutting them off of each seed individually. An apparatus to mechanically remove appendages from seeds so that they can be conveyed and singulated for precision planting would be of great value to the seed industry.

SUMMARY OF THE INVENTION

We have discovered a novel method and apparatus for threshing seeds to remove appendages attached to the seeds. With our invention, seeds armed with appendages that cannot be removed with existing seed threshing equipment can no be threshed.

The apparatus of the invention comprises a chamber for containing seed with appendages which is to be threshed; a seed entry means communicating with the chamber for feeding seed with appendages into the chamber; a means for drawing a gaseous medium through the chamber to suspend seed with appendages in the chamber; filament spool means rotatively mounted in the chamber; a means for rotating the filament spool means so that filament on the spool is paid out from the spool and contacts the suspended seed to remove appendages from the seed; and a means for removing appendage-free seed from the chamber.

The method of the invention comprise feeding seed with appendages into a chamber; drawing a gaseous medium through the chamber to suspend the seed with appendages in the chamber; rotating a filament spool means positioned in the chamber so that filament on the spool is paid out and contacts the suspended seed with appendages to remove appendages from the seed; and removing the appendage-free seed from the chamber.

In accordance with this discovery, it is an objective of the invention to provide a filament seed threshing system which will remove appendages from seed. With our invention appendage-free seed is obtained which has the planting advantages described above. Seed threshed according to our method can be conveyed and singulated so that precision mechanical planters can be used, resulting in increased planting efficiency and decreased production costs over hand planting.

It is also an object of the invention to provide a seed thresher for use in the threshing of seeds armed with appendages that are difficult or impossible to remove with existing seed threshing devices.

Another important objective of the invention is the provision of a method and apparatus for the continuous threshing of seed to provide greater quantities of finished product.

It is another object of the invention to provide a means to thresh seed used for food, spice, oil, or other nonplanting uses. For example, with the invention, the hull can be removed from oilseed such as meadowfoam to obtain a husk-free seed, effectively raising the oil content of the seed product.

It is a further object of the invention to provide a means to remove appendages from seed without the use of compressed air or rubbing action, thereby avoiding the disadvantages of such threshing techniques.

Other objects and advantages of the invention will become readily apparent from the ensuing description.

DESCRIPTION OF THE PREFERRED EMBODIMENT

The method and apparatus of the invention are next described in detail with reference to the attached drawings.

Figure 1:
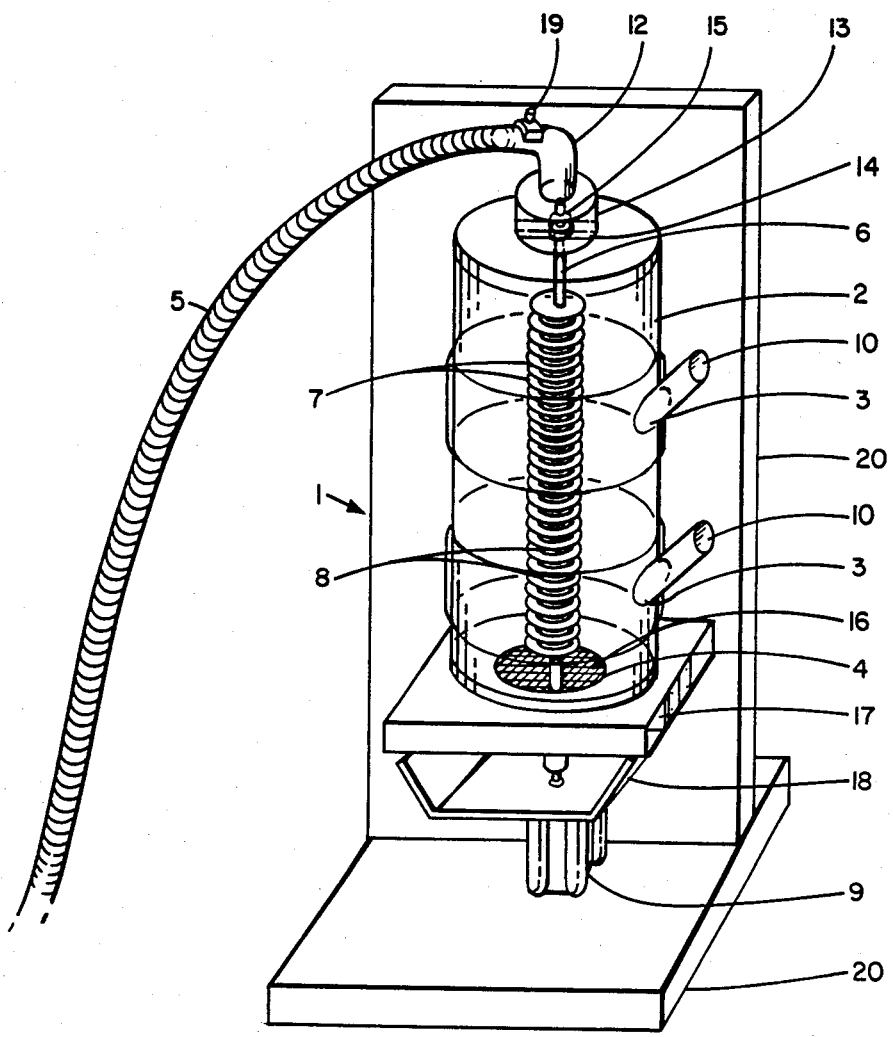
FIG. 1 is a perspective view of the filament seed thresher in the static state.
Figure 2:
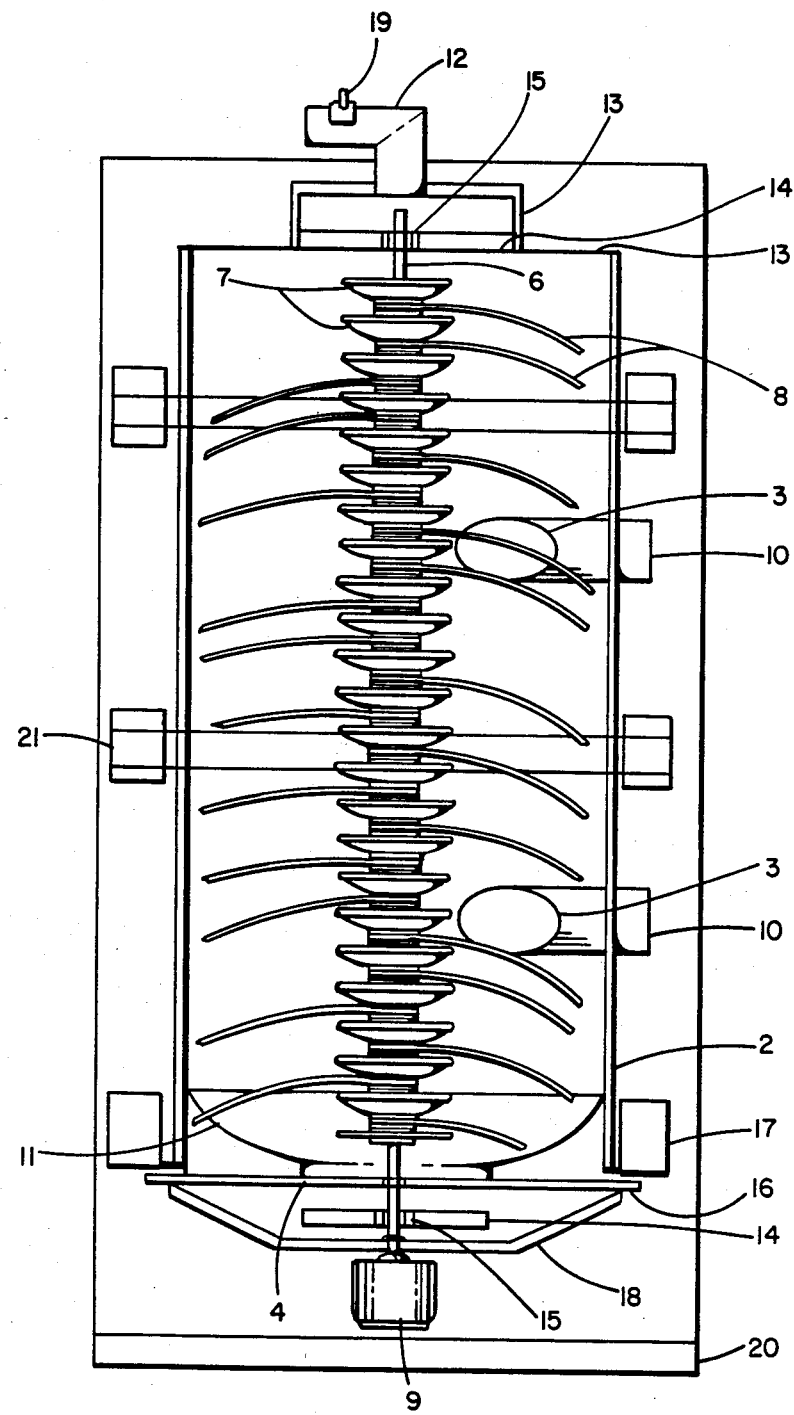
FIG. 2 is a front elevation view of the filament seed thresher in the dynamic state.
Figure 3:
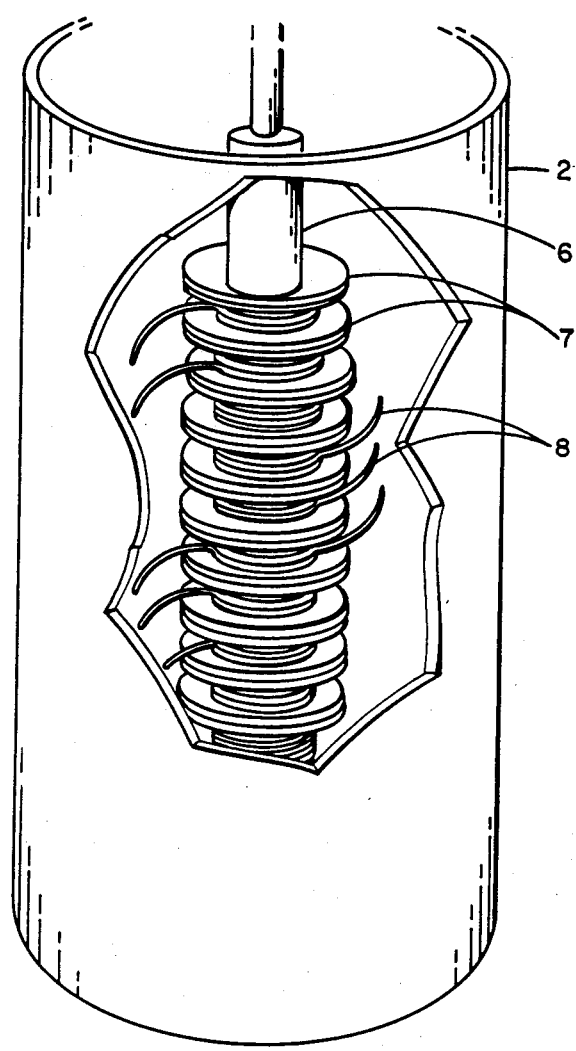
FIG. 3 is a cutaway perspective view of the filament seed thresher showing the rotating spools of filament.

Referring to FIGS. 1-3, the filament seed thresher is generally indicated by numeral 1. The apparatus includes a hollow chamber 2 for containing seed with appendages which is to be threshed. In the context of this invention, the term "seed with appendages" denotes any seed having attached thereto appendages such as awns, beards, tails, hair, fuzz, pappus, bristles, and the like; the term "appendage-free seed" denotes seed which has been threshed such that the appendages have been removed. Chamber 2 includes means to allow for feed of seed with appendages into the chamber. These are shown as seed entry ports 3. While only one seed entry port is necessary to the practice of the invention, multiple ports can be used to increase feed capacity. As shown in the preferred embodiment, hollow tube 10 communicating with chamber 2 through entry port 3 and tangential to the side wall of chamber 2 aids in the feed of seed with appendages into the chamber.

Vertically oriented in the chamber is rotor shaft 6 which is rotated by means of motor 9. The shaft is supported by upper and lower bearing holders 14 having ball bearings 15. At least one spool means 7 is positioned in the chamber in coaxial relationship to the rotor shaft. Filament 8 has a coiled section wound about the spool and, in the dynamic condition as shown in FIGS. 2 and 3, has a free traveling end section which extends generally peripherally from the spool and is swung arcuately about the spool upon rotation of shaft 6. The area through which the free traveling end of the filament moves to thresh the seed with appendages defines a threshing zone in the cylinder. The radius of the zone is determined by the length of the free traveling end of the filament which is paid out from the spool and rotated about the spool. The height of the zone is determined by the vertically oriented travel of the free traveling end of the filament. Although a single filament may be used for threshing seed, a plurality of spools each with a threshing filament is preferred to provide a larger threshing zone and increased threshing capacity. Spool means 7 may be frictionally attached to shaft 6, or the rotor shaft may be provided with a flange located beneath the bottom spool mean to support the spools on the shaft for rotation therewith.

Chamber 2 also includes seed discharge port 4 located downstream from the threshing zone for removal of appendage-free seed from the chamber. Conical insert 11 having a central aperture is located downstream from the threshing zone. In the embodiment shown in the drawings, discharge port 4 is defined by the central aperture of conical insert 11. The insert serves to guide appendage-free seed to the discharge port and to restrain seed with appendages from exiting the chamber prior to removal of all the appendages.

Gas-drawing means 5 is attached to chamber 2 for drawing a gaseous medium through the chamber to suspend seed with appendages in the chamber in the threshing zone. In the preferred embodiment, flow of gaseous medium through the chamber is carried out by attachment of vacuum means 5 to vacuum port 12 which communicates with chamber 2 upstream from the threshing zone. The vacuum port is attached to chamber 2 be means of end cap 13. Control valve 19 attached to vacuum port 12 controls the velocity of aspirated gaseous medium through the chamber.

Where desired, screen 16 of selected hole size is placed downstream from seed discharge port 4 to allow passage of the appendage-free seed of a selected size. The screen is supported by screen holder 17. Catch pan 18 located below discharge port 4 provides for the collection of appendage-free seed. As shown in FIGS. 1 and 2, chamber 2 is supported by support member 20 having a base and backboard. Bands 21 hold the chamber to the backboard. The backboard also supports the lower rotor bearing holder. The upper bearing holder is attached to end cap 13.

Chamber 2 is fabricated from any rigid material, preferably one which is stable under reduced pressure. Thus, for example, chamber 2 may be manufactured from glass, metal, rigid plastic, and the like. Chamber 2 may be of any conventional design for containing seed which is to be threshed. It is preferred that the chamber be cylindrical because the rotating filament defines a circular threshing path. The size of the chamber may be varied depending on the desired threshing capacity. The minimum cross sectional diameter of the chamber is that which provides sufficient volume for threshing of the seed by the free traveling end portion of the filament. The length of the cylinder is dependent on the threshing capacity that is desired as determined by the number of spools positioned on shaft 6. Increased threshing capacity results when the number of spools, each with a rotating filament, is increased.

The size and number of the seed entry ports should be that which is sufficient to accomodate the seed feed capacity that is desired. Similarly, the seed discharge port should be suffcienty large to meet seed discharge requirements. Because the gaseous medium is aspirated through the discharge and entry ports, the size of these ports must not be so large that gas aspirated into the chamber exceeds the capacity of the vacuum means.

Filament 8 should have sufficient rigidity and tensile strength to thresh the seed, that is, to detach appendages such as awns, fuzz, tails, beards, and the like from the seed. The filament should preferably also have sufficient fatigue, abrasion, and impact resistance to provide reasonable service life. To thresh seeds according to the invention, it is important is have the proper weight of filament as determined by the cross sectional diameter of the filament. The filament must be of sufficient weight so that when the spool is rotated, the filament is paid out a length sufficient to define the radius of the threshing zone that is desired such that during rotation the filament is swung through a cross sectional plane in the chamber to contact the suspended seed with appendages. As described in detail below, where seed is to be used for planting subsequent to threshing, the filament must not be so heavy that contact with the filament damages the seed such that germination and vigor are not maintained.

It is preferred that filament 8 be made of elastoplastic extrusion which has been stretched to align the molecules axially. An example of such a filament is nylon monofilament such as fishing line. However, other filaments may be used, as for example, yarn, cord, rope, twine, braided line, or monofilament, whether described as elastoplastic, elastomeric, natural fiber, or synthetic fiber and whether compounded of several materials as long as the parameters described above are met.

It is preferred that filament 8 be made of nonmetallic material as metal filament tends to be too rigid to provide proper threshing and tends to cut and damage seed.

As stated above, where seed is to be used for planting, viability of the seed must be maintained so that it will germinate upon planting. Since the nature of seed appendages and susceptibility of individual seed types to damage vary, filament diameter is selected based on the type of seed to be threshed. For typical flower seeds ranging in length from approximately 0.15 to 1.3 cm, we have found that a filament having a diameter of 0.1 to 0.4 mm will give satisfactory results. If the seed to be threshed is susceptible to damage, a lighter filament, that is, one with a smaller cross sectional diameter should be used. For seeds which are less susceptible to damage and have resistant appendages, heavier filament, up to about 1 mm is used.

Rotation speeds of shaft 6 should be that sufficient to cause portions of appendages on the seed to be removed upon repeated contact of the seed with the filament. Where the seed is to be used for planting, rotation speed must not be so great that threshing destroys the viability of the seed. Normal rotation speeds to thresh flower seed using filaments having a diameter of 0.01 to 0.04 cm are on the order of 5,000 to 10,000 rpm.

In operation, each of spools 7 in chamber 2 is rotated with shaft 6 upon actuation of motor 9. Filament 8 is paid out from the spool due to the centrifugal force generated by the rotation of the spool, thereby providing a free traveling end section extending outwardly from the spool to the desired length as determined by the diameter of the filament as described above. Rotation of the spool causes the free traveling end portion of the filament to be swung arcuately about the spool.

A vacuum is appied to the upper end of the chamber. This causes a negative pressure (partial vacuum) to be created and air is drawn through the seed discharge port and seed entry ports and through the chamber. Seed is aspirated into the chamber through seed entry ports 3 with the aid of feed tubes 10. The velocity of the aspirated air through the cylinder is adjusted by means of valve 19 so that seed with appendages fed into the cylinder is suspended in the threshing zone, that is, in the area where the free traveling portion of filament 8 is swung about the spool. This may be accomplished by adjusting the velocity of air through the chamber to the approximate terminal velocity of the seed. Upon the rotation of spool 7, the traveling portion of filament 8 contacts the seed. The repeated contact causes an appendage or portions of an appendage to be removed. As appendages are removed, the terminal velocity of the seed is increased and the appendage-free seed falls out of the threshing zone and out discharge port 4. Loosened appendages and fragments of appendages, once free from the seeds, have terminal velocities low enough so that they are removed from the cylinder with the aspirated air through vacuum port 12. As filament 8 wears and becomes shortened due to contact with seeds, filament is automatically paid out from spool 7 in replacement. Conical insert 11 restrains seed from being discharged from the chamber before all appendages are removed. Appendage-free seed is collected in catch pan 18. Where desired, screen 17 of a selected hole size may be used to restrict the discharge of seed of a particular dimension. Operation may be carried out as a batch process or on a continuous basis.

The following example is presented to further illustrate the method and apparatus of the invention and is not intended to limit the scope of the invention which is defined by the claims.

EXAMPLE

The filament seed thresher used in the following experiments had the following characteristics. The hollow cylindrical chamber was made of acrylic plastic and had an outer diameter (o.d.) of 15 cm, a wall thickness of 3 mm, and a length of 40 cm. The seed entry ports communicating with the chamber were made as follows: two rectangular openings were milled in the side wall of the chamber centered at a distance of 10 and 30 cm from the upper end of the cylinder. Sliding closures for the rectangular openings were constructed of sections of 150-mm acrylic tubing with 30-mm o.d. tubing intersecting tangentially. Holes were drilled in the sliding sections for entry ports for the 30-mm tubing.

An acrylic end cap with upper shaft bearing bracket and vacuum port was fit snugly onto the upper cylinder end. A vacuum aspirator hose was attached to the vacuum port. A lower bearing bracket was mounted below the lower cylinder end. The rotor shaft, which was supported by the bearing brackets, was constructed of 10-mm o.d. hollow steel tubing 37 cm in length with 6-mm diameter bearing shafts brazed to each end.

Eighteen, 50-mm diameter, 18-mm wide spools (with 0.28-mm diameter nylon monofilament wrapped counterclockwise over 25-mm spindles) were fit snugly over the shaft to provide a frictional fit with the shaft to rotate therewith. A 0.06-kw motor, separately mounted with variable speed controller, was flex-connected to the lower end of the shaft allowing clockwise speeds of 0–12,000 rpm. A bypass valve in the vacuum hose was used to adjust the air volume aspirated through the cylinder. A support having a backboard and base supported the cylinder vertically.

A conical-shaped insert at the lower end of the chamber served to restrain seed from being discharged from the chamber before all the appendages were removed. The seed discharge port of the chamber was defined by a 9-cm diameter central opening in the conical insert. Optionally, a screen was mounted below the seed discharge port.

The filament seed thresher was operated with both the rotor shaft and vacuum running. In these tests, a single rotor speed of 8,000 rpm was used. Seeds were aspirated into the cylinder through one of the 30-mm feed tubes. The velocity of aspirated air through the chamber was adjusted until the seed was suspended in the threshing zone. A portion of the nylon monofilaments paid out from the spool a distance of approximately 6–7 cm. The monofilaments spinning with the rotor shaft repeatedly struck seeds removing portions of their appendages. As appendages were removed, the terminal velocity of the seed particles increased, causing the seeds to drop to the lower end of the cylinder where they passed through the discharge port into a collection pan. Fragments of the appendages loosened from the seeds were removed with the aspirated air.

Four types of seed, marigold, gazania, arctotis, and anemone, that produce appendages that resist removal by conventional seed conditioning equipment were threshed with the filament seed thresher. Approximately 100 grams of each seed type were threshed in these tests. Marigold seed was threshed in 100-gm batches for a measured time period of 5 minutes per batch. A screen having a round hole size of 2 mm was positioned below the seed discharge port during threshing of marigold seed. The other three seed types were threshed on a continuous basis.

The degree of appendage removal and the percentage germination of threshed seed lots and the percentage germination of unthreshed control lots are tabulated in Table 1. Evaluation of the degree of threshing was based on subjective observation of seed growers. Evaluation of changes in percentage germination was carried out according to the standard seed testing procedures of the Association of Official Seed Analysts.

As can be seen from the data in Table 1, excellent appendage removal was obtained and viability of the seed was maintained as shown by the germination results.

TABLE 1

| Seed Type | Appendage Removal (%) | Germination Control (%) | Germination Threshed (%) |
| --- | --- | --- | --- |
| Marigold | 70–80 | 91 | 92 |
| Gazania | 90–100 | 78 | 78 |
| Arctotis | 90–100 | 36 | 29 |
| Anemone | 100 | — | — |

It is understood that the forgoing detailed description is given merely by way of illustration and that modification and variations may be made therein without departing from the spirit and scope of the invention.

Having thus described our invention, we claim:

1. An apparatus for threshing seed having appendages attached thereto to remove the appendages from the seed to obtain appendage-free seed, which comprises:
   (a) a chamber for containing seed with appendages which is to be threshed;
   (b) seed entry means communicating with said chamber to permit feed of seed with appendages into said chamber;
   (c) means for drawing a gaseous medium through said chamber to suspend seed with appendages in said chamber;
   (d) filament spool means rotatively mounted in said chamber;
   (e) means for rotating said filament spool means so that filament on said spool means is paid out from said spool and contacts the suspended seed to remove appendages from the seed and provide appendage-free seed; and
   (f) means for removing appendage-free seed from said chamber.

2. The apparatus as described in claim 1 wherein said chamber is a hollow cylinder and said filament is nylon monofilament.

3. The apparatus as described in claim 1 wherein said gas-drawing means includes a vacuum aspirator.

4. An apparatus for threshing seed having appendages attached thereto to remove the appendages from the seed to obtain appendage-free seed, which comprises a hollow cylindrical chamber having an upper and lower end; a seed entry port in said chamber to feed seed into said chamber; a seed discharge port located at said lower end of said chamber for removing appendage-free seed; vacuum means attached to the upper end of said chamber to draw air into said seed discharge port and through said chamber and suspend seed with appendages in said chamber; a rotor shaft vertically oriented in said chamber for rotation upon an axis; at least one spool of filament mounted on said shaft so that when said shaft is rotated, said spool rotates and said filament on said spool is paid out from said spool to provide a free traveling filament portion which contacts the suspended seed and removes the appendages to provide appendage-free seed.

5. A method for threshing seed having appendages attached thereto to remove the appendages and provide appendage-free seed which comprises:
   (a) feeding seed with appendages into a chamber through a seed entry means communicating with said chamber
   (b) drawing a gaseous medium through said chamber to suspend the seed with appendages in said chamber
   (c) rotating a filament spool means located in said chamber so that filament on said spool means is paid out and contacts the suspended seed to remove appendages from the seed and provide appendage-free seed; and
   (d) removing the appendage-free seed from said chamber.

* * * * *